July 12, 1938.  E. FROMWILLER  2,123,331
COFFEE MAKER
Filed Nov. 11, 1935
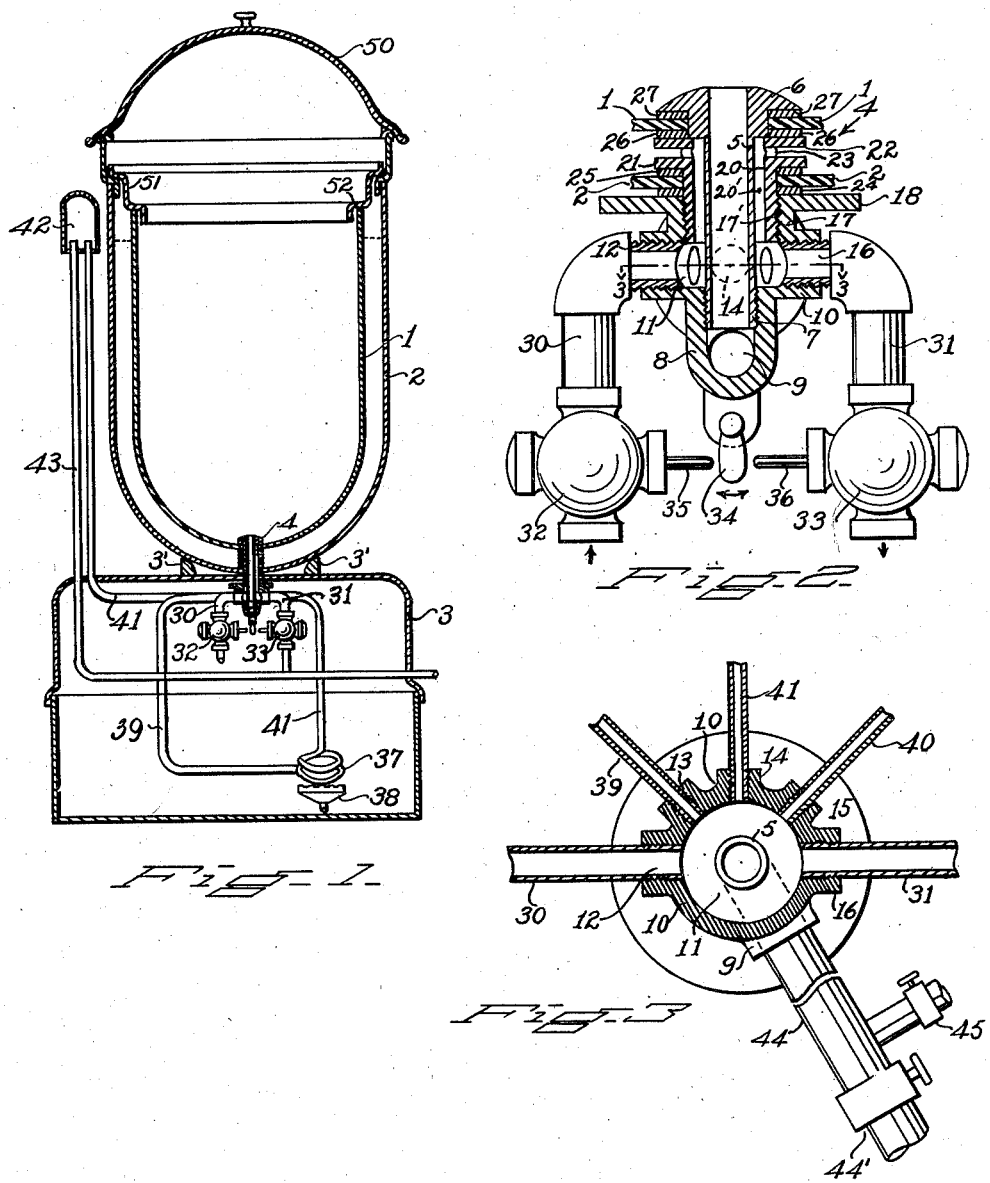
Edward Fromwiller, INVENTOR.
BY
Gifford, Scull & Burgess ATTORNEYS.

Patented July 12, 1938

2,123,331

UNITED STATES PATENT OFFICE 2,123,331

COFFEE MAKER

Edward Fromwiller, Brooklyn, N. Y.

Application November 11, 1935, Serial No. 49,193

2 Claims. (Cl. 220—14)

This invention relates to a container for coffee which enables the coffee to be kept hot and agitated whenever desired, ready to be drawn off and used at any time. By this invention two jars are provided and so arranged that the inner one contains the coffee and the outer one is spaced from the inner one in such a manner that hot water can be kept between the two for keeping the coffee hot and the water can be used for washing the inner jar whenever desired. This is a continuation in part of my application, Serial Number 25,386, filed June 7, 1935.

The invention will be understood from the description in connection with the accompanying drawing, in which Fig. 1 is a vertical section through an illustrative embodiment of the invention; Fig. 2 is a section on an enlarged scale showing some of the details; and Fig. 3 is a section along the line 3—3 of Fig. 2.

In the drawing, reference character 1 indicates the inner jar and reference character 2 indicates the outer jar which is spaced from the inner one. A support 3 is indicated for the jars, which support may have an annular ring 3' to aid in preventing the jars from tilting. The holding and spacing member represented on the whole by the reference character 4 is provided for holding the jars. It comprises a central hollow member or pipe 5 that has a flange 6 at its upper end and is externally threaded at its lower end as indicated at 7.

An internally threaded elongated cap 8 is provided which is screwed upon the threaded end 7 of the pipe 5. An outlet 9 for a purpose to be described below is provided for the cap 8. An integral annulus 10 is provided on the cap 8 of such size that an annular space 11 is left around the pipe 5 when the cap is in place on this pipe. The annulus 10 is provided with a series of radially extending outlets 12, 13, 14, 15 and 16, which are screw threaded and provide access through this annulus to the space 11 around the pipe 5. An internally threaded extension 17 integral with the annulus 10 is provided on the other side of the annulus 10 from the outlet 9 of the cap 8 and this extension is internally threaded as indicated at 17' and is provided with a circular flange 18 at its upper end.

A nipple 20 having screw threads at one end is screwed into the extension 18 and is of sufficient size to leave a space 20' around the pipe 5. Spaced flanges 21 and 22 are provided for the nipple 20 and holes or openings 23 extend through the nipple 20 between flanges 21 and 22.

Gaskets or packing rings 24, 25, 26 and 27, respectively, are provided on opposite sides of the openings through the lower ends of the jars 1 and 2 so that when the nipple 20 is tightened in the extension 18 and the pipe 5 is tightened in the cap 8 these gaskets will make water and air tight joints and will eliminate the danger of breaking the jars 1 and 2, even when they are made of glass. With the support 4 arranged and connected as described, communication is provided from the inside of the inner jar 1 to the outlet 9 of the cap 8 and communication is also provided from each one of the screw threaded openings 12, 13, 14, 15 and 16, through the annular space 11 and space 20' and holes 23 to the space between the jars 1 and 2.

An inlet pipe 30 for water, which may be either hot or cold water from any convenient source, is connected to the opening 12 of the annulus 10, and an outlet pipe 31 is connected to the opening 16. Valves 32 and 33 are provided for the pipes 30 and 31 so that water can be admitted into the space between the jars 1 and 2 by opening the valve 32, and water can be withdrawn from this space by opening the valve 33. For operating the valves 32 and 33 a handle or operating member 34 may be provided between the spring pressed extensions 35 and 36 of these valves so that this handle or member can be turned in one direction to open one of the valves and in the other direction to open the other one, these valves automatically closing when the other one is open. Such valves themselves are in common use and constitute no part of the present invention and will not be further described in detail.

A heating coil 37, or other heating device for water, is provided to be heated, for example by means of the burner 38. Opposite ends of this coil or heater are connected by pipes 39 and 40, respectively, to the openings 13 and 15 of the annulus 10, thus providing means for keeping the water between the jars hot, as the hot water from the heater 37, passing through the pipe 40 and opening 15, will rise in the space between the jars and cooler water will descend through the opening 13 and pipe 39 back to the heater 37.

An overflow pipe 41 extends from the opening 14 to the container 42 that is open at the top and is so located that its top is somewhat below the upper end of the jar 2 and its bottom is slightly below the upper end of the jar 1. An outlet or drain pipe 43 leads from the lower end of the container 42 and terminates below the upper end of the jar 1.

A valved pipe 44 provided with a valve 44' leads from the outlet 9 of the cap 8 for the purpose of drawing coffee from the inner jar 1 whenever desired. An air pipe 45 connected to any convenient source of compressed air or steam, for example, enters the pipe 44 between the valve 44' and connection 9 so that the contents or coffee in the jar 1 may be agitated, whenever desired, by blowing fluid through it. A convenient source of the air is for example from the tank as shown in my application Ser. No. 25,386 referred to above.

A cover or top 50 is shown for the jar 2 and a holder 51 rests upon the upper end of the jar 1. This removable, ring shaped support is provided with a ledge 52 upon which a removable reticulated tray or container for coffee grounds can be retained so that when hot water is introduced into the jar 1 through these coffee grounds coffee is made in the jar 1, ready to be used.

The operation is as follows:

Coffee is made in the inner jar 1 by passing hot water through coffee grounds held on a container that may rest upon the ledge 52. This coffee is kept hot by the hot water between the jars 1 and 2 and this hot water is in turn kept hot by being circulated by gravity through the heater 37. The source of the water between the jars 1 and 2 is through pipe 30 which may lead from a source of hot water, such as the tank mentioned above, and the water enters the space between the jars so long as the valve 32 is open. The water is drained from between the jars by opening the valve 33.

The pipe 30 is larger than the pipe 41 so that when it is desired to wash the inner jar 1 water is permitted to enter through the pipe 30 rapidly enough to overflow the upper edge of the jar 1.

I claim:

1. In a device of the character described, two containers one inside the other and means to maintain said containers in spaced relation, said means comprising an internally threaded cap having an internally threaded extension thereon, an externally threaded pipe screwed into said internally threaded cap and having a flange thereon and an externally threaded nipple screwed into said externally threaded extension and having a flange in proximity to said first named flange when the parts are assembled.

2. In a device of the character described, two containers one inside the other and means to maintain said containers in spaced relation, said means comprising an internally threaded cap having an internally threaded extension thereon, a flange on said extension, an externally threaded pipe screwed into said internally threaded cap and having a flange thereon and an externally threaded nipple screwed into said internally threaded extension and having a flange in proximity to said first named flange and another flange in proximity to said internally threaded extension when the parts are assembled.

EDWARD FROMWILLER.